(12) United States Patent
Li

(10) Patent No.: US 6,751,220 B1
(45) Date of Patent: Jun. 15, 2004

(54) APPARATUS AND METHOD OF MANAGING VIRTUAL PRIVATE NETWORK ROUTING DATA

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 701 days.

(21) Appl. No.: 09/591,756

(22) Filed: Jun. 12, 2000

(51) Int. Cl.$^7$ .......................... H04L 12/56; H04L 12/66
(52) U.S. Cl. ...................... 370/390; 370/392; 370/401
(58) Field of Search .................. 370/389, 390, 370/392, 400, 401, 402, 408, 409

(56) References Cited

U.S. PATENT DOCUMENTS 5,768,271 A * 6/1998 Seid et al. ................ 370/389
6,078,586 A * 6/2000 Dugan et al. ............ 370/395.2
6,526,056 B1 * 2/2003 Rekhter et al. ............ 370/392
6,594,704 B1 * 7/2003 Birenback et al. ......... 709/238
6,597,701 B1 * 7/2003 Howell ...................... 370/410

* cited by examiner

Primary Examiner—Min Jung
(74) Attorney, Agent, or Firm—Steubing McGuinness & Manaras LLP

(57) ABSTRACT

An apparatus and method of managing given VPN routing data received for a given VPN encodes the given VPN routing data into a format that is compatible with a located routing table. The encoded VPN routing data then is stored in the routing table. The routing table may have routing data for the given VPN, and routing data for another VPN. Accordingly, the routing table is capable of storing VPN routing data for more than one VPN.

49 Claims, 5 Drawing Sheets

1

APPARATUS AND METHOD OF MANAGING VIRTUAL PRIVATE NETWORK ROUTING DATA

FIELD OF THE INVENTION

The invention generally relates to networks and, more particularly, the invention relates to management of routing tables utilized for transmitting data across a network.

BACKGROUND OF THE INVENTION

Information is transmitted across the Internet in accord with the well known Internet Protocol (hereinafter "IP"). Among other things, IP specifies that information is to be transmitted from network device to network device within data packets. To facilitate data transmission across the Internet, each data packet includes a header with address information (e.g., the address of the destination network device) and a payload (i.e., the information being transmitted). Accordingly, a network device receiving IP data packets uses the data in the packet header to determine how to forward such data packet to other network devices in the network. To that end, network devices utilizing IP include routing tables that each lists a specific network device address and/or a family of network device addresses, and pre-specified routing data for data packets destined for each such network device. A network device receiving an IP data packet thus utilizes the address data in the header as an index in its relevant routing table to ascertain the prescribed routing data.

Various types of data traffic are maintained in routing tables in different ways. For example, virtual private networks (referred to herein as"VPNs") are specified to store their relevant routing data for no more than one VPN in a single routing table. Specifically, as known in the art, a VPN is a plurality of network devices connected to a third party network (e.g., the Internet) that encrypt data packets sent through the network to other member VPN network devices. Encrypting VPN data traffic ensures the privacy of the VPN transmissions. As the number of VPNs on the Internet increases, however, single network devices are required to maintain an increasing number of routing tables. Undesirably, maintaining a single routing table for each VPN can cause scaling, stability, and other problems in the network.

SUMMARY OF THE INVENTION

In accordance with one aspect of the invention, a method and apparatus for managing virtual private network ("VPN") routing data stores encoded VPN routing data in a routing table. To that end, VPN routing data is received, and then encoded into a format that is compatible with a protocol associated with the routing table. The encoded VPN routing data then is stored in the routing table (as noted above). The protocol is different from VPN.

In illustrative embodiments, a given VPN packet is received from a given interface. Once received, the given interface is matched with a given VPN identifier that identifies the given VPN. It also may be determined if the given VPN is a large mode VPN or a small mode VPN. Moreover, the encoded VPN routing data may be stored in a multicast address space in the routing table. In a similar manner, the VPN routing data may be encoded into a multicast format. For example, the encoded VPN routing data may be stored in at least one of a class D and a class E address space in the routing table. The routing table may include routing data for at least two different VPNs.

In other embodiments, the received VPN routing data relates to a given VPN. In such case, the routing table may have data relating to the given VPN, and another VPN. Additionally, the routing data may be encoded by forming a bit combination that complies with a multicast entry in the routing table. In illustrative embodiments, the received VPN routing data relates to a given VPN having a given route, VPN identifier identifying the given VPN, and a mode identifier indicating whether the given VPN is a small mode VPN or a large mode VPN. The routing data thus may be encoded to be a bit combination that includes the VPN identifier, the mode identifier, and the given route.

In accordance with another aspect of the invention, an apparatus and method of managing given VPN routing data received for a given VPN encodes the given VPN routing data into a format that is compatible with a located routing table. The encoded VPN routing data then is stored in the routing table. In illustrative embodiments, the routing table has routing data for the given VPN, and routing data for another VPN. Accordingly, the routing table is capable of storing VPN routing data for more than one VPN.

Various embodiments of the invention are implemented as a computer program product having a computer usable medium with computer readable program code thereon. The computer readable code may be read and utilized by a computer system in accordance with conventional processes.

BRIEF DESCRIPTION OF THE FIGURES

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, VPN routes (also referred to herein as "VPN addresses") are encoded for storage in conventional routing tables. Storing VPN addresses in this manner permits VPN data from many different VPNs to be stored in a single routing table. Accordingly, scaling and stability problems associated with the current practice of storing VPN data for no more than one VPN in a routing table are alleviated. Details of illustrative embodiments of the invention are discussed below.

Figure 1:
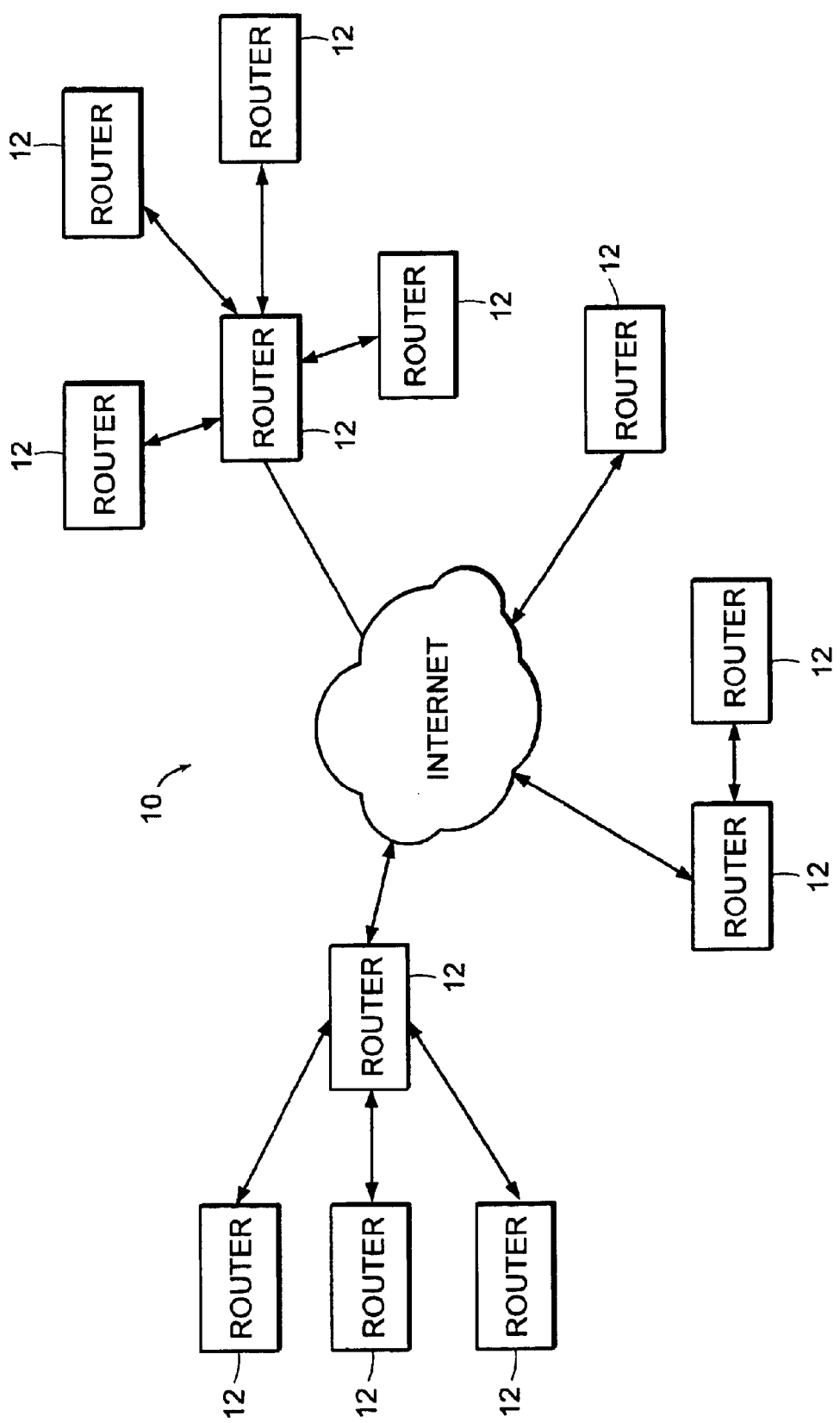
FIG. 1 shows a generalized exemplary network arrangement that may be utilized with illustrative embodiments.

FIG. 1 schematically shows an exemplary network 10 that may be used with illustrative embodiments of the invention. The network 10 includes a plurality of network devices ("routers 12") that communicate via the Internet. The routers 12 are configured to operate in accord with the well known Internet Protocol ("WP"). Additionally, the routers 12 also may form a plurality of conventional virtual private networks ("VPNs"). The virtual private networks may be any type of VPN, such as "large site VPNs" and "small site VPNs." In illustrative embodiments, small site VPNs may be local sites spanning relatively small distances. In contrast, large site VPNs may be a plurality of small site VPNs (and/or large site VPNs) that are aggregated to a single node. When using the border gateway protocol ("BGP," mentioned below), the routers 12 can exchange large site VPN routes only. Of course, principles of illustrative embodiments apply to any sized VPN and thus, discussion of small site and large site VPNs are discussed by way of example only.

The network 10 may be configured in any known configuration, and with various types of routers 12. For example, the network 10 may include routers 12 functioning as "provider edge" routers and "customer edge" routers. Such types of routers 12 are well known in the art and described in greater detail in Request for Comments number 2547 ("RFC 2547" of the Internet Engineering Task Force), entitled, "BGP/MPLS VPNs" and written by E. Rosen and Y. Rekhter in March of 1999, the disclosure of which is incorporated herein, in its entirety, by reference.

Figure 2:
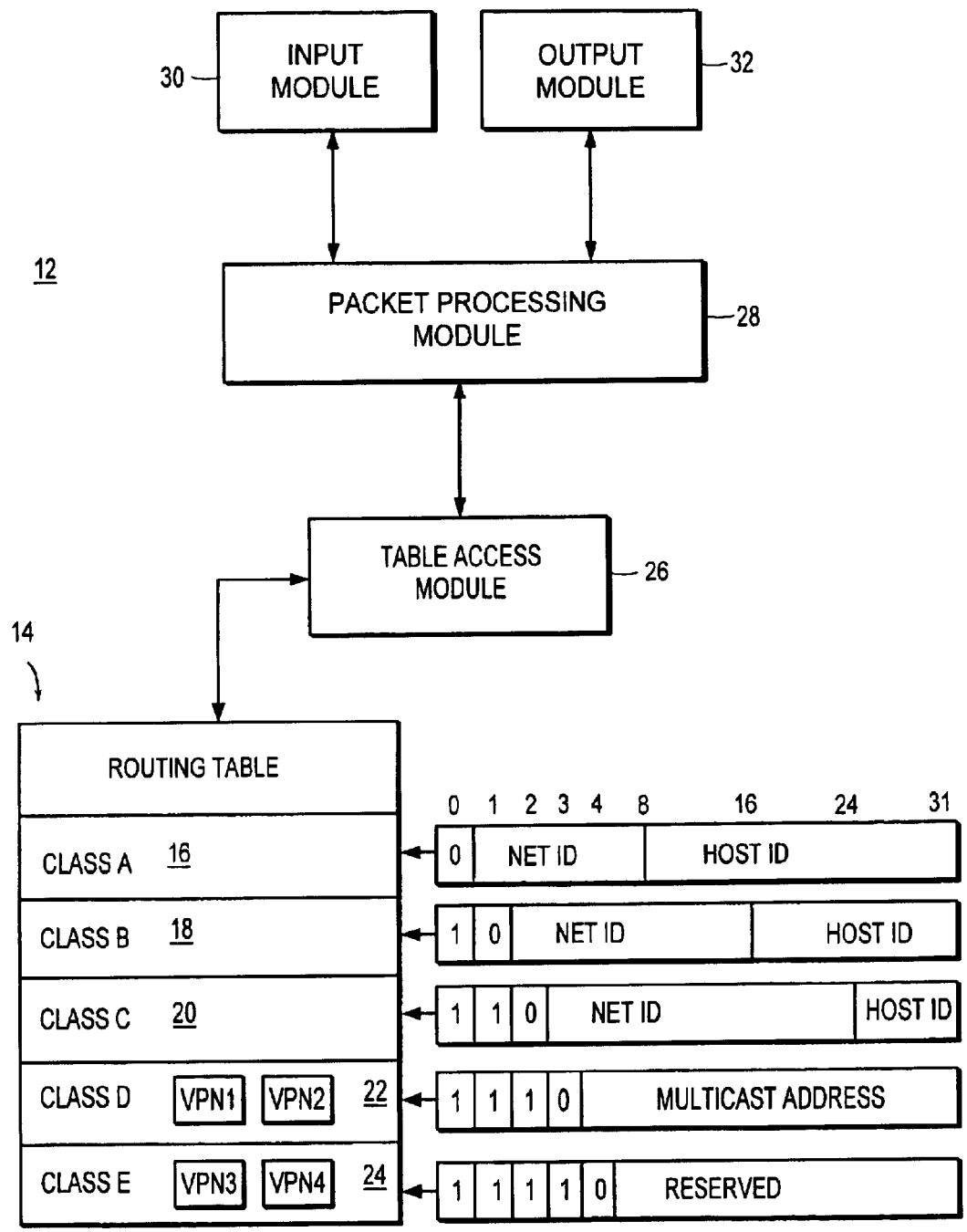
FIG. 2 schematically shows a routing table and various modules utilized by illustrative embodiments for accessing the routing table.

Each router 12 in the network 10 shown in FIG. 1 includes at least one conventional routing table having routing information for forwarding data packets, and accompanying modules for processing data packets. FIG. 2 shows an exemplary routing table 14 that may be utilized by any one of the routers 12, and a plurality of accompanying modules within such router. In illustrative embodiments, the routing table 14 is in the control plane (not shown) of a router. Among other functions, such routing table 14 may be used to update routing tables in the forwarding plane of the router. Details of an illustrative routing table updating process are discussed with regard to FIG. 3. In other embodiments, the routing table 14 is in the forwarding plane (not shown) of the router 12 and thus, primarily used to forward data packets. Details of an illustrative data packet forwarding process are discussed with regard to FIG. 5.

The exemplary routing table 14 preferably is a unicast routing table having an address space for storing class A through class E routing data. The routing table 14 therefore includes a class A address space 16, a class B address space 18, a class C address space 20, a class D address space 22, and a class E address space 24 (each discussed in greater detail below). The format of addresses stored in the respective address spaces 16–24 are shown in FIG. 2 (also discussed below). It should be noted, however, that although various embodiments of the invention are discussed with reference to unicast routing tables, many embodiments are not intended to be limited to such type of routing tables. Accordingly, in such embodiments, unicast routing tables are discussed by example only.

As known in the art, class A addresses are used for networks having more than 65,536 (i.e., $2^{16}$) hosts, class B addresses are used for intermediate sized networks having between 256 (i.e., $2^8$) and 65,536 hosts, and class C addresses are used for networks having 256 or fewer hosts. Each of these address spaces 16, 18, and 20 is specifically intended for use with unicast traffic. To distinguish the different classes of addresses, routing tables 14 are specified to set one or more of the highest order bits to a preselected pattern depending upon the class. To that end, as shown in FIG. 2, class A addresses are stored so that their highest order bit is set to "0," while class B addresses are stored so that their two highest order bits are set to "1" and "0," respectively. In a similar manner, class C addresses are stored so that their three highest order bits are set to "1," "1," and "0," respectively.

Class D addresses are specified to be used with multicast traffic, and are distinguished by setting the four highest order bits to "1," "1," "1," and "0," respectively. Class E addresses are specified as being reserved for no stated type of data, and are distinguished by setting the five highest order bits to "1," "1," "1," "1," and "0," respectively. As shown in FIG. 2, illustrative embodiments store VPN address data in class D and E address space 22 and 24. Moreover, address data for more than one VPN can be stored in either of these address spaces 22 and 24. Accordingly, a conventional table access module 26 that is utilized to manage the routing table 14 (i.e., controlling access, updates, and other related processes) can be used to access VPN addresses. In illustrative embodiments, the table access module 26 is conventional routing table access software.

As known in the art, VPN addresses are not in a format that complies with the class A–E format. Accordingly, illustrative embodiments include a packet processing module 28 that converts VPN addresses into a format that may be stored in the routing table 14 (discussed below with reference to FIG. 4). The packet processing module 28 performs further functions, some of which are discussed below with reference to FIGS. 3–5. In illustrative embodiments, the packet processing module 28 is configured to operate with various routing protocols. Those protocols may be any routing protocol, such as the open shortest path first protocol ("OSPF"), the routing information protocol ("RIP"), and BGP (mentioned above). In addition to the routing table 14, table access module 26, and packet processing module 28, the router 12 also includes an input module 30 for receiving data packets, and an output module 32 for forwarding data packets.

Figure 3:
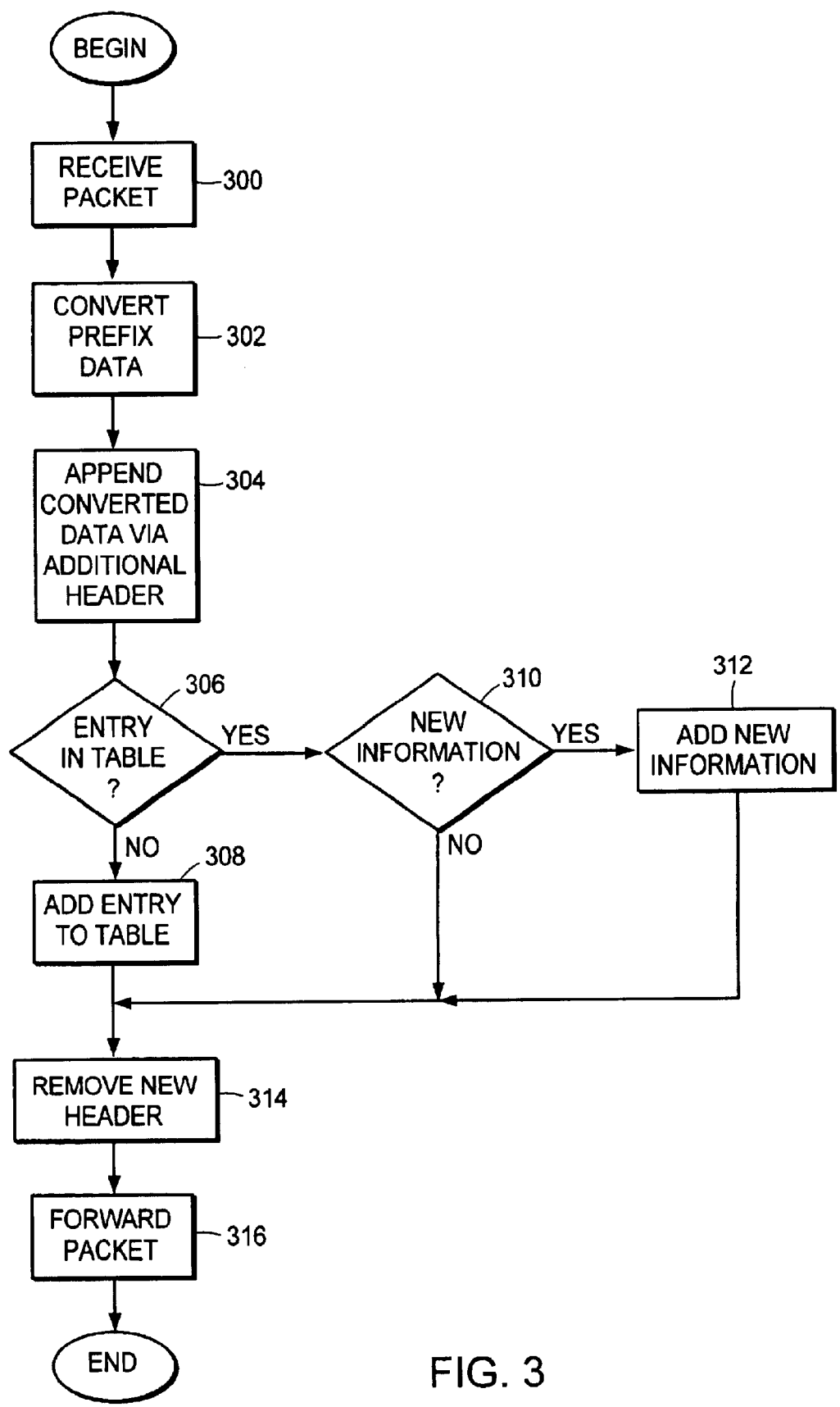
FIG. 3 shows a process of updating the routing table shown in FIG. 2 in accordance with illustrative embodiments of the invention.

FIG. 3 shows a process executed by the packet processing module 28 for updating the routing table 14 shown in FIG. 2 in accordance with illustrative embodiments of the invention. The process begins at step 300, in which a data packet is received via the input module 30. Such packet may be received from a neighboring router 12 executing a routing protocol, such as BGP. The packet includes a payload with address data relating to one specified VPN, and other routing data. Such address data is referred to herein as "prefix data." In alternative embodiments, the prefix data and/or routing data are received from a plurality of data packets relating to the same VPN. In still other embodiments, the prefix data and/or routing data is/are ascertained based upon data received in the data packet(s). For example, preliminary prefix data received in a data packet may be processed by the receiving router 12 to ascertain the actual prefix data.

Once received, the prefix data is parsed from the payload of the data packet and converted into a format that is compatible with the routing table 14 (step 302). This converted data, which is converted into class D or class E address form, is referred to herein as "converted data." It should be noted that this conversion process encodes the prefix data with VPN identifier data, mode data (i.e., small mode VPN or large mode VPN), and class D or class E information. Details of this conversion process are discussed below with reference to FIG. 4.

Once the converted data is calculated at step 302, it is added to the received data packet as an additional header (step 304). It then is determined at step 306 if there is an entry in the routing table 14 that matches the converted data in the additional header. If no such entry exists, then the process continues to step 308, in which the converted data is added to the table as a new entry. Routing data (e.g., from the payload of the packet) also is added to the table.

Conversely, if it is determined at step 306 that an entry matching the converted data exists in the routing table 14, then the process continues to step 310. At step 310, it is determined if the routing information received in the data packet for the given VPN is more up to date than that already stored in the routing table 14. In other embodiments, step 310 is skipped and the new routing, data merely overwrites the existing routing data for the matched entry. If the routing data is not more up to date than the existing routing data, then the process merely continues to step 314 (discussed below). Alternatively, if the received routing data is more up to date, then the process continues to step 312, in which the new routing data is added to the routing table 14 by overwriting the existing routing data.

The process then continues to step 314, in which the additional header is removed from the data packet. Once the additional header is removed, the data packet may be forwarded to another router 12 (e.g., the next hop router 12) in accordance with conventional processes (step 316). It should be noted that although this process in FIG. 3 is discussed in terms of specified steps, various steps can be executed in different orders. Accordingly, discussion of this process (and the below discussed processes of FIG. 4 and 5) in the exact discussed order is not intended to limit various embodiments of the invention.

As noted above, FIG. 4 shows an illustrative process of converting VPN address information for a single VPN to a class D or class E address, which is compatible with the format required by the routing table 14. This process is described herein with reference to an exemplary packet for a specific large mode VPN (the "given VPN") having a VPN identifier (i.e., to identify the given VPN) of "4," and route data "192.32.0.0/16." The process begins at step 400, in which the VPN identifier is ascertained. In illustrative embodiments, the VPN identifier is determined based upon the interface that receives the packet. More particularly, the router 12 includes a look up table that matches a VPN identifier (also referred to herein as a "VPN index") with an interface of the router 12. Each interface therefore receives VPN data for no more than one specific VPN. In addition, the look up table also may include data indicating, whether the specific VPN is a small mode VPN or a large mode VPN. Accordingly, in the example given, based upon the interface, it is determined that the given VPN has a VPN identifier of "4," and that it is a large mode VPN.

The route then is determined from the payload within the packet (step 402). In the example, the payload is parsed to determined that the route data is "192.32.0.0/16." The index data and route data then are split into two separate thirty-two bit data blocks (step 404). Once split, the process continues to step 406, in which the three highest order bits of the index data block are set to be "1," "1," and "1," respectively. The value of the VPN identifier (i.e., the VPN index) then is set in the next twelve highest order bits of the index data block (step 408).

It then is determined at step 410 if the given VPN is a large mode VPN. If the VPN is a large mode VPN (i.e., like the exemplary given VPN), then the next bit of the index data is set to be "1." Accordingly, in the example given, the exemplary index data block has the following value: "11100000000010010000000000000000." Namely, the first three bits are set to be "111," the next twelve bits are set to be binary "4," the next bit is set to be "1," and the last sixteen bits are set to be "0." In IP decimal notation, the index data block reads as follows, "224.9.0.0."

Returning to step 410, if it is determined that the VPN is not a large mode VPN, then the process continues to step 414, in which the next bit (after the twelve bits representing the VPN identifier) is set to be "0." Accordingly, if the exemplary given VPN were a small mode VPN, then the exemplary index data block would have the following value: "11100000000010000000000000000000." In IP decimal notation, the index data thus would read as follows, "224.8.0.0."

In addition to forming the index data block, the packet processing module 28 also must form the route data block. Of course, the index data block and route data block could be formed simultaneously, or the route data block could be formed before the index data block. Continuing from step 414 (i.e., the case when the VPN is not a large mode VPN), the route data block then is shifted eight bits to the left, thus removing the highest order eight bits. The process then continues to step 418, in which the route data block is shifted sixteen bits to the right, thus removing the sixteen lowest order bits of the shifted route data block (in the small mode case), or the sixteen lowest order bits of the original route data block (in the large mode case). For the exemplary given VPN, the route data would thus read, in IP decimal notation, "0.0.192.32/32." The process then continues to step 420, in which the index data block is added to the route data block to form the final encoded VPN address. Of course, the final encoded VPN address is in a format that is compatible with the routing table 14. Specifically, the VPN address is formatted to be storable in either the class D or class E address space 22 and 24 of the routing table 14. In the example given, the final VPN address is encoded to be, "224.9.192.32/32" and thus, is stored in the class D address space 22.

It should be noted that steps 414 and 416 (i.e., the small mode VPN case only) effectively cause the route data to lose the highest order eight bits. Accordingly, in some embodiments, the routing table 14 has an additional eight bit field to store the eight highest order bits of the route data that are lost when the route data block is shifted eight bits to the left.

Figure 4:
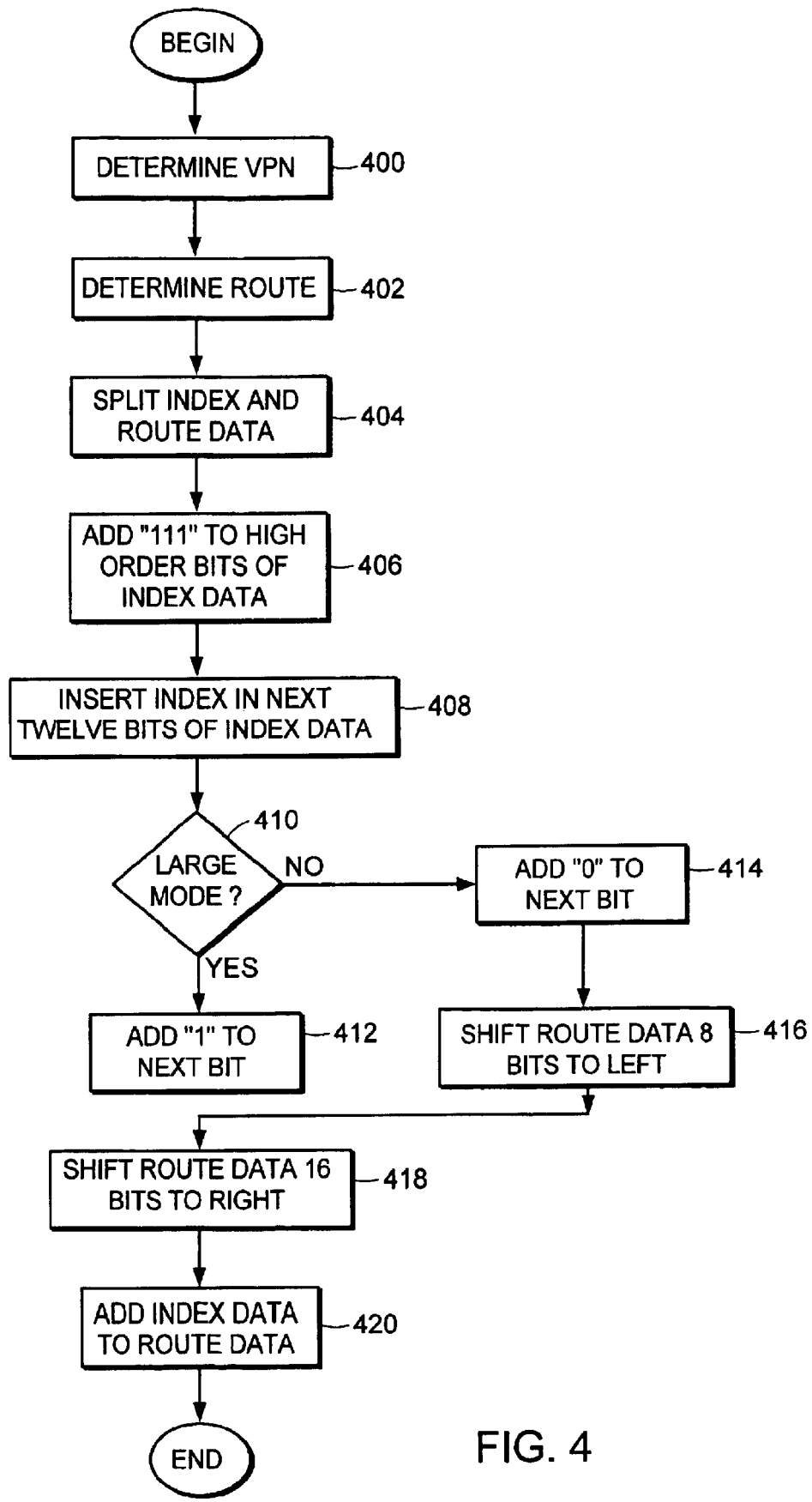
FIG. 4 shows a process of converting a VPN address into a multicast address that is compatible with the routing table shown in FIG. 2.

Qualitatively, for forming the sixteen least significant bits of the converted address, the process in FIG. 4 utilizes the middle sixteen bits of VPN addresses of small mode VPNs, or the most significant sixteen bits of large mode VPNs. Furthermore, the packet processing module 28 forms the sixteen most significant sixteen bits of the converted VPN address by setting each of the first three bits to "1," the second twelve bits set to the VPN identifier, and the next (sixteenth) bit to "1" if it is large mode VPN, and to "0" if it is a small mode VPN.

Below is a table showing some exemplary VPN addresses (in IP decimal form), and their form after being converted in accord with the process shown in FIG. 4. Each VPN address is preceded by the letters "LS" if it is a large site, the letters "SS" if it is a large site, and the VPN identifier. The route and mask data follow immediately after the VPN identifier.

| VPN ADDRESS | CONVERTED ADDRESS |
| --- | --- |
| SS-4-192.32.128.0/24 | 224.8.32.128/32 |
| SS-4-192.32.128.0/23 | 224.8.32.128/31 |
| SS-4-192.32.128.0/22 | 224.8.32.128/30 |

-continued

| VPN ADDRESS | CONVERTED ADDRESS |
|---|---|
| SS-4-192.32.128.0/21 | 224.8.32.128/29 |
| SS-4-192.32.128.0/20 | 224.8.32.128/28 |
| LS-4-192.32.0.0/16 | 224.9.192.32./32 |
| LS-4-192.32.0.0/15 | 224.9.192.32./31 |
| LS-4-192.32.0.0/14 | 224.9.192.32./30 |
| Ls-4-192.32.0.0/13 | 224.9.192.32./29 |
| LS-4-192.32.0.0/12 | 224.9.192.32./28 |

VPN data in the routing table 14 thus may be accessed in various manners. For example, as noted above, conventional routing software may be utilized. Additionally, routing entries in the class D and E address space 22 and 24 may be re-converted back to VPN address format by means of a process that reverses the steps of the process shown in FIG. 4.

Figure 5:
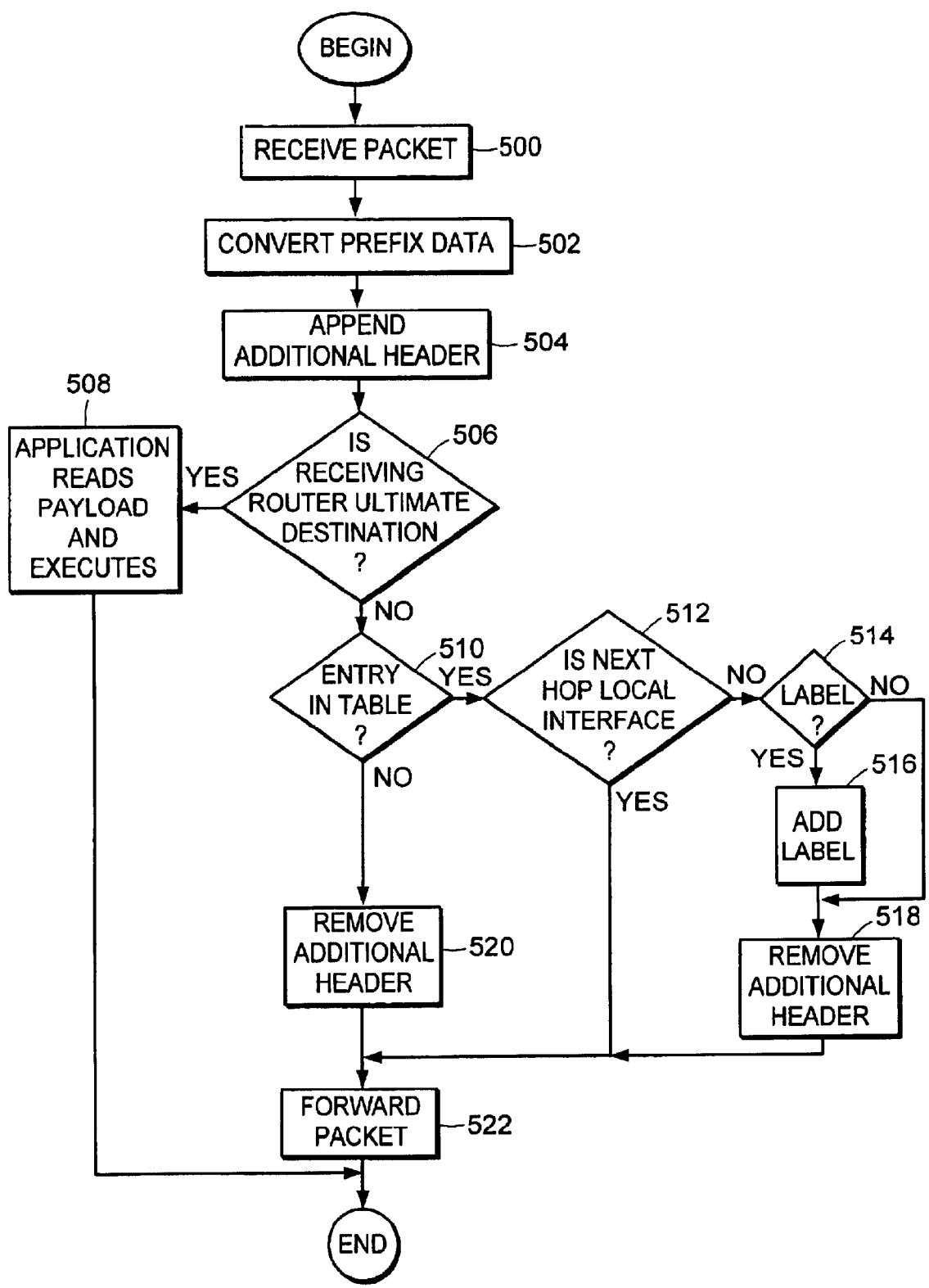
FIG. 5 shows a process of forwarding data packets received by a given router in accordance with illustrative embodiments of the invention.

In addition to being used to update routing tables 14 (FIG. 3), various embodiments can be used to forward data packets. For example, data packets transmitted within various VPNs can be forwarded in accord with various protocols, such as the Telnet protocol, the File Transfer Protocol ("FTP") and the Transmission Control Protocol ("TCP"). FIG. 5 shows a process of forwarding data packets received by a given router 12 in accordance with illustrative embodiments of the invention. The process beings at step 500, in which in which a data packet is received via the input module 30. The packet includes a payload with address data relating to one specified VPN, and other routing data. As discussed with regard to FIG. 3, the prefix data and/or routing data may be received from a plurality of data packets relating to the same VPN. In a similar manner, the prefix data and/or routing data may be ascertained based upon data received in the data packet(s). For example, preliminary prefix data received in a data packet may be processed by the given router 12 to ascertain the actual prefix data.

Once received, the prefix data is parsed from the payload of the data packet and converted into a format that is compatible with the routing table 14 (step 502). This conversion process, which is discussed above with regard to FIG. 4, encodes the prefix data with VPN identifier data, mode data (i.e., small mode VPN or large mode VPN), and class D or class E information.

Once the converted data is calculated at step 502, it is added to the received data packet as an additional header (step 504). It then is determined at step 506 if the given router 12 is the ultimate destination of the data packet. If the given router 12 is the ultimate destination, then the process continues to step 508, in which an application destined to receive the data in the data packet uses such data in any desired manner. Such application can be any application, such as a Protocol Independent Multicast ("PIM") application, a Telnet application, or an email program. Of course, discussion of these applications is not intended to limit the scope of various embodiments of the invention. Accordingly, illustrative embodiments may be utilized with many different types of applications.

Returning to step 506, if the receiving router 12 is not the ultimate destination of the data packet, then it is determined at step 510 if there is an entry in the routing table 14 matching the converted data. If such an entry exists, then it is determined at step 512 if the next hop router 12 is to be accessed via a local interface (i.e., one in the VPN of the data packet). If the next hop router 12 is not to be accessed via a local interface, then it is determined at step 514 if the entry in the routing table 14 refers to a label (of a label switched network) instead of a next hop router address. If the entry does refer to a label, then the VPN necessarily uses a label switching network, such as the MPLS (Multiprotocol Label Switching) backbone. Accordingly, the process continues to step 516, in which a label is added to the data packet, and then to step 518, in which the additional header is removed. The data packet then is forwarded to the MPLS backbone for forwarding to the next network device (step 522).

Returning to step 514, if the entry in the routing table 14 does not refer to a label, then the process continues to step 518, in which the additional header is removed from the data packet. The data packet then is forwarded to the next hop router 12 as specified in the routing table 14 (step 522). Returning to step 512, if it is determined that the data packet is to be forwarded to the next hop router 12 via a local interface, then the data packet is forwarded to such next hop router 12 with the additional header (step 522). Finally, returning to step 510, if an entry for the converted VPN address does not exist in the routing table 14, then the additional header is removed at step 520, and the data packet then is forwarded to the next hop router 12 as specified in its original header (step 522).

Accordingly, as noted above, illustrative embodiments of the invention permit routing data for more than one VPN to be stored in a single routing table 14. VPN routing data thus may be accessed by using existing routing table access software. Moreover, use of a single routing table 14 for multiple VPNs reduces scaling and stability problems associated with prior art solutions of utilizing one routing table 14 per VPN.

Some embodiments of the invention may be implemented in any conventional computer programming language. For example, illustrative embodiments may be implemented in a procedural programming language (e.g., "C") or an object oriented programming language (e.g., "C++"). Alternative embodiments of the invention may be implemented as preprogrammed hardware elements (e.g., application specific integrated circuits and digital signal processors), or other related components.

Moreover, various embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention are disclosed below, it should be apparent to those skilled in the art that various changes and modifications can be made which will achieve some of the advantages of the invention without departing from the true scope of the invention. These and other obvious modifications are intended to be covered by the claims and appendix that follows:

I claim:

1. A method of managing VPN routing data, the method comprising:
    receiving VPN routing data in a payload of a VPN packet, wherein the VPN routine data includes at least one VPN route;
    encoding the VPN routing data into a format that is compatible with a protocol associated with a routing table, the protocol being different from VPN; and
    storing the encoded VPN routing data in the routing table.

2. The method as defined by claim 1 wherein the act of receiving comprises:
    receiving the VPN packet for a given VPN from a given interface; and
    matchinig the given interface with a given VPN identifier, the given VPN identifier identifying the given VPN.

3. The method as defined by claim 2 wherein the act of receiving further comprises:
    determining if the given VPN is a large mode VPN or a small mode VPN wherein a large mode VPN comprises a VPN spanning a relatively large distance, and a small mode VPN comprises a VPN spanning a relatively small distance.

4. The method as defined by claim 1 wherein the encoded VPN routing data is stored in a multicast address space in the routing table.

5. The method as defined by claim 1 wherein the VPN routing data is encoded into a multicast format.

6. The method as defined by claim 1 wherein the act of storing comprises:
    storing the encoded VPN routing data in at least one of a multicast and a reserved address space of the routing table.

7. The method as defined by claim 1 wherein the routing table includes routing data for at least two different VPNs.

8. The method as defined by claim 1 wherein the received VPN routing data relates to a given VPN, the routing table having data relating to the given VPN and another VPN.

9. The method as defined by claim 1 wherein the act of encoding comprises:
    forming a bit combination that complies with a multicast entry in the routing table.

10. The method as defined by claim 1 wherein the received VPN routing data relates to a given VPN, the given VPN having a VPN identifier identifying the given VPN, a mode indicating whether the given VPN is a small mode VPN or a large mode VPN, and a given route, wherein a large mode VPN comprises a VPN spanning a relatively large distance, and a small mode VPN comprises a VPN spanning a relatively small distance, the act of encoding comprising:
    forming a bit combination that includes the VPN identifier, the mode of the given VPN, and the given route.

11. The method as defined by claim 1 further comprising:
    forwarding the VPN routing data to a network device.

12. An apparatus for managing VPN routing data, the method comprising:
    an input module for receiving VPN routing data in a payload of a VPN packet, wherein the VPN routing data includes at least one VPN route;
    an encoding module operatively coupled with the input module, the encoding module encoding the VPN routing data into a format that is compatible with a protocol associated with a routing table, the protocol being different from VPN; and
    a storage module operatively coupled with the encoding module, the storage module storing the encoded VPN routing data in the routing table.

13. The apparatus as defined by claim 12 wherein the input module comprises:
    a receiver for receiving the VPN packet for a given VPN from a given interface; and
    a matching module operatively coupled with the receiver, the matching module matching the given interface with a given VPN identifier, the given VPN identifier identifying the given VPN.

14. The apparatus as defined by claim 13 wherein the input module is capable of determining if the given VPN is a large mode VPN or a small mode VPN, wherein a large mode VPN comprises a VPN scanning a relatively large distance, and a small mode VPN comprises a VPN spanning a relatively small distance.

15. The apparatus as defined by claim 12 wherein the encoded VPN routing data is stored in a multicast address space in the routing table.

16. The apparatus as defined by claim 12 wherein the VPN routing data is encoded into a multicast format.

17. The apparatus as defined by claim 12 wherein the storage module stores the encoded VPN routing data in at least one of a multicast and a reserved address space of the routing table.

18. The apparatus as defined by claim 12 wherein the routing table includes routing data for at least two different VPNs.

19. The apparatus as defined by claim 12 wherein the received VPN routing data relates to a given VPN, the routing table having data relating to the given VPN and another VPN.

20. The apparatus as defined by claim 12 wherein encoding module forms a bit combination that complies with a multicast entry in the routing table.

21. The apparatus as defined by claim 12 wherein the received VPN routing data relates to a given VPN, the given VPN having a VPN identifier identifying the given VPN, a mode indicating whether the given VPN is a small mode VPN or a large mode VPN, and a given route, the encoding module forming a bit combination that includes the VPN identifier, the mode of the given VPN, and the given route, wherein a large mode VPN comprises a VPN spanning a relatively large distance, and a small mode VPN comprises a VPN spanning a relatively small distance.

22. A computer program for use on a computer system for managing VPN routing data, the computer program product comprising a computer usable medium having computer readable program code thereon, the computer readable program code comprising:
    program code for receiving VPN routing data in a payload of a VPN packet, wherein the VPN routing data includes at least one VPN route;

program code for encoding the VPN routing data into a format that is compatible with a protocol associated with a routing table, the protocol being different than VPN; and program code for storing the encoded VPN routing data in the routing table.

23. The computer program product as defined by claim 22 wherein the program code for receiving comprises:

program code for receiving the VPN packet for a given VPN from a given interface; and program code for matching the given interface with a given VPN identifier, the given VPN identifier identifying the given VPN.

24. The computer program product as defined by claim 23 wherein the program code for receiving further comprises:

program code for determining if the given VPN is a large mode VPN or a small mode VPN, wherein a large mode VPN comprises a VPN spanning a relatively large distance, and a small mode VPN comprises a VPN spanning a relatively small distance.

25. The computer program product as defined by claim 22 wherein the encoded VPN routing data is stored in a multicast address space in the routing table.

26. The computer program product as defined by claim 22 wherein the VPN routing data is encoded into a multicast format.

27. The computer program product as defined by claim 22 wherein the program code for storing comprises:

program code for storing the encoded VPN routing data in at least one of a multicast and a reserved address space of the routing table.

28. The computer program product as defined by claim 22 wherein the routing table includes routing data for at least two different VPNs.

29. The computer program product as defined by claim 22 wherein the VPN routing data received relates to a given VPN, the routing table having data relating to the given VPN and another VPN.

30. The computer program product as defined by claim 22 wherein the program code for encoding comprises:

program code for forming a bit combination that complies with a multicast entry in the routing table.

31. The computer program product as defined by claim 22 wherein the received VPN routing data relates to a given VPN, the given VPN having a VPN identifier identifying the given VPN, a mode indicating whether the given VPN is a small mode VPN or a large mode VPN, and a given route, wherein a large mode VPN comprises a VPN spanning a relatively large distance, and a small mode VPN comprises a VPN spanning a relatively small distance, the program code for encoding comprising:

program code for forming a bit combination that includes the VPN identifier, the mode of the given VPN, and the given route.

32. A method of managing given VPN routing data received for a given VPN, the VPN routing data received in a payload of a VPN packet, when the VPN routing data includes at least one VPN route, the method using a routing table, the method comprising:

encoding the given VPN routing data into a format that is compatible with the routing table; and storing the encoded VPN routing data in the routing table, the routing table having routing data for the given VPN, and routing data for another VPN.

33. The method as defined by claim 32 further comprising:

receiving the VPN packet with the given VPN routing data, the given VPN packet being received from a given interface; and matching the given interface with a given VPN identifier that identifies the given VPN.

34. The method as defined by claim 33 further comprising:

determining if the given VPN is a large mode VPN or a small mode VPN, wherein a large mode VPN comprises a VPN spanning a relatively large distance, and a small mode VPN comprises a VPN spanning a relatively small distance.

35. The method as defined by claim 32 wherein the given VPN routing data is encoded into a multicast format.

36. The method as defined by claim 32 wherein the encoded VPN routing data is stored in a multicast address space in the routing table.

37. The method as defined by claim 32 wherein the encoded VPN routing data is stored in at least one of a multicast and a reserved address space of the routing table.

38. An apparatus for managing given VPN routing data received for a given VPN, in a payload of a VPN packet, wherein the VPN routing data includes at least one VPN route the method comprising:

an encoding module that encodes the given VPN routing data into a format that is compatible with a routing table; and a storage module operatively coupled with the encoding module, the storage module storing the encoded VPN routing data in the routing table, the routing table having routing data for the given VPN, and routing data for another VPN.

39. The apparatus as defined by claim 38 further comprising:

an input module for receiving the VPN packet with the given VPN routing data, the given VPN packet being received from a given interface; and a matching module operatively coupled with the input module, the input module matching the given interface with a given VPN identifier tat identifies the given VPN.

40. The apparatus as defined by claim 39 further comprising: means for determining if the given VPN is a large mode VPN or a small mode VPN, wherein a large mode VPN comprises a VPN spanning a relatively large distance, and a small mode VPN comprises a VPN spanning a relatively small distance.

41. The apparatus as defined by claim 38 wherein the given VPN routing data is encoded into a multicast format.

42. The apparatus as defined by claim 38 wherein the encoded VPN routing data is stored in a multicast address space in the routing table.

43. The apparatus as defined by claim 38 wherein the encoded VPN routing data is stored in at least one of a multicast and a reserved address space of the routing table.

44. A computer program product for use on a computer system for managing given VPN routing data received for a given VPN in a payload of a VPN packet, wherein the VPN routing data includes at least one VPN route, the computer program product comprising a computer useable medium having computer readable program code thereon, the computer readable program code comprising:

program code for encoding the given VPN routing data into a format that is compatible with a routing table; and program code for storing the encoded VPN routing data in the routing table, the routing table having routing data for the given VPN, and routing data for another VPN.

45. The computer program product as defined by claim 44 further comprising:

program code for receiving the given VPN packet with the given VPN routing data, the given VPN packet being received from a given interface; and program code for matching the given interface with a given VPN identifier that identifies the given VPN.

46. The computer program product as defined by claim 45 further comprising:

program code for determining if the given VPN is a large mode VPN or a small mode small mode VPN comprises a VPN spanning a relatively small distance.

47. The computer program product as defined by claim 44 wherein the given VPN routing data is encoded into a multicast format.

48. The computer program product as defined by claim 44 wherein the encoded VPN routing data is stored in a multicast address space in the routing table.

49. The computer program product as defined by claim 44 wherein the encoded VPN routing data is stored in at least one of a multicast and a reserved address spacing of the routing table.

* * * * *